United States Patent [19]

Kennedy, Jr. et al.

[11] 3,745,911

[45] July 17, 1973

[54] COOKING UTENSIL

[76] Inventors: William D. Kennedy, Jr., P.O. Box 398, Colonial Heights, Va. 23824; Lawrence G. Gunn, 5308 Pender Ct., Alexandria, Va. 22304

[22] Filed: Oct. 22, 1971

[21] Appl. No.: 191,917

[52] U.S. Cl. ............................................ 99/426
[51] Int. Cl. ............................................ A47j 43/18
[58] Field of Search................ 99/426, 353, 386, 99/403, 404, 416, 427; 249/92, 164, 167, 170

[56] References Cited
UNITED STATES PATENTS

| | | | |
|---|---|---|---|
| 3,511,172 | 5/1970 | Jones | 99/426 |
| 2,967,474 | 1/1961 | Ford | 99/404 |
| 3,602,130 | 8/1971 | Perez | 99/404 |
| 2,957,404 | 10/1960 | Richardson | 99/426 |

*Primary Examiner*—William I. Price
*Assistant Examiner*—Arthur O. Henderson
*Attorney*—Harold W. Adams

[57] ABSTRACT

A utensil for forming and cooking a tortilla including a perforated multi-section outer plate, said sections being pivotally inter connected; a handle; means for rigidly attaching one of said sections to said handle to support said multi-section outer plate in an open, substantially flat position to receive a tortilla; and a perforated U shaped inner plate pivotally attached to said handle for preforming the tortilla into a taco shell when said outer plate is secured to said inner plate. The inner and outer plates may be provided with grooves within their respective interfaces inter connecting said perforations. A cavity may be provided within the inner plate for receiving a food substance to be cooked within and simultaneously with said taco shell.

7 Claims, 4 Drawing Figures

PATENTED JUL 17 1973 3,745,911

INVENTORS
WILLIAM D. KENNEDY, Jr.
LAWRENCE G. GUNN
BY
Harold W. Adams
ATTORNEY

INVENTORS
WILLIAM D. KENNEDY, Jr.
LAWRENCE G. GUNN
BY
Harold W. Adams
ATTORNEY

COOKING UTENSIL

BACKGROUND OF THE INVENTION

Numerous devices for preparing taco shells from a tortilla are known. For instance the following United States patents disclose such cooking utensils: U.S. Pat. Nos. 2,775,929 G. R. Johnson et al.; 2,957,404 L. A. Richardson; 2,778,294 J. A. Ulloa; 2,847,933 R. L. Pate; 3,020,826 L. Silva; 2,635,528 V. P. Torres; 2,814,981 N. A. Wendel; 2,627,222 S. M. Luna; 2,967,474 J. C. Ford.

SUMMARY OF INVENTIONS

Although cooking utensils for molding tortillas to form a taco shell and cooking same in a vessel are known, to the inventors' knowledge none disclose means for preheating where required and preforming a tortilla into a taco shell in a cooking utensil whereby the taco may be cooked on both sides in a flat vessel with or without complete immersion in a cooking oil. A particular disadvantage of known utensils for preparing tacos is the difficulty of inserting the tortilla into the utensil prior to cooking. This is a serious limitation when attempting to prepare tacos from frozen tortillas which require thawing or preheating for softening of the tortilla prior to insertion into the utensil. Even when thawed and relatively flexible tortillas are difficult to insert into the known cooking utensils because of their combersome design and constant exposure of the uses to the hot cooking oil and utensils. With such conventional devices — clamps, forceps, and other instruments are generally required to position the tortilla within the utensil in order to avoid burning the user.

Further none of the known utensils enable simultaneous cooking of a taco filling within a preformed shell.

BRIEF DESCRIPTION OF INVENTION

Accordingly an object of this invention is to provide a cooking utensil for preparing a taco from a tortilla in which the tortilla may be easily inserted and including means for preforming and cooking the tortilla, without total immersion within a cooking oil.

Another object is to provide a utensil for preparing a taco from a tortilla including inner and outer plates for preforming the tortilla and uniformly distributing the cooking oil over the surface of the tortilla.

A further object of the invention is to provide a utensil for preparing a taco from a tortilla wherein a taco filling may be cooked simultaneously with the preformed tortilla.

BRIEF DESCRIPTION OF THE DRAWINGS

These and many other objects and advantages of the invention will become apparent from the following detailed description of a preferred embodiment of the invention when read in view of the appended drawings wherein.

DETAILED DESCRIPTION OF THE INVENTION

Figure 1:
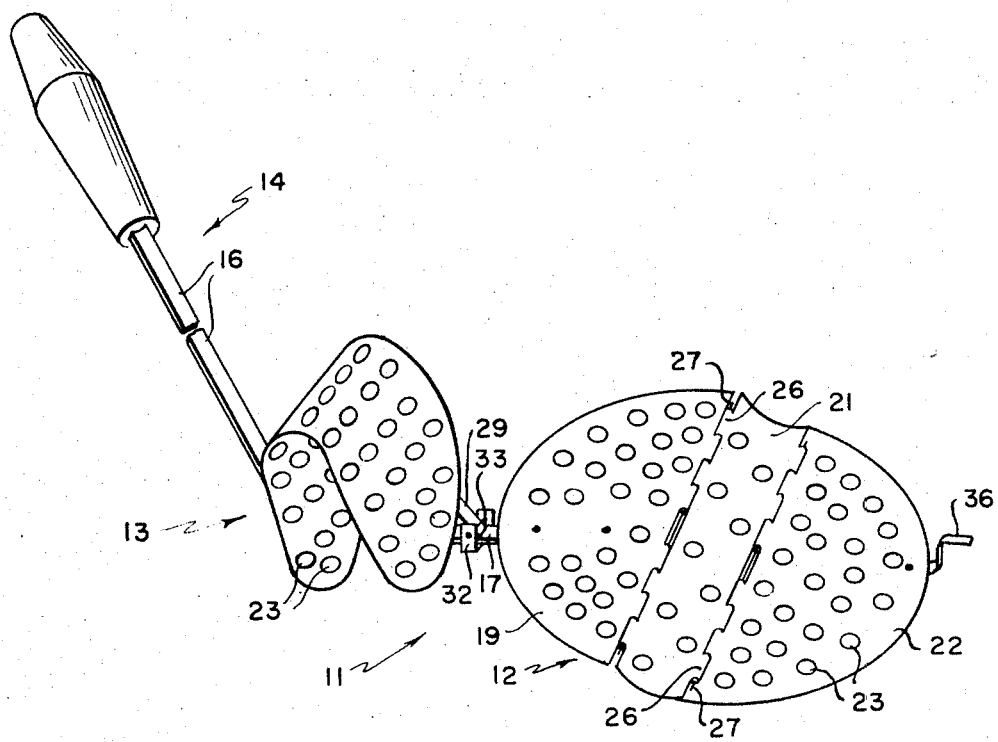
FIG. 1 is a perspective view of a preferred embodiment of the invention illustrating the utensil in an open tortilla receiving position.

Referring now to the FIGURES and 2 of the drawings, a preferred embodiment of the invention is designated generally by reference numeral 11 and includes a multi-section outer plate designated by reference numeral 12 and inner plate 13 connected to an adjustable handle 14 provided with an insulating grip 15. The handle 14 includes a body portion 16 and end portion 17. A curved foot rest 18 is provided at the extremity of end portion 17. The length of end portion 16, including the foot rest, is less than the diameter of a skillet or other shallow vessel within which a tortilla is to be cooked, body portion 16 of handle 14 extending angularly from end portion 17 permitting the utensil to be inserted into and turned over within the cooking vessel. The length of end portion 17 may be easily adjusted by the use of clamp 20 which when tightened secures the body portion 16 and end portion 17 rigidly together.

The outer plate 12 is formed of multiple, pivotally interconnected sections 19, 21, and 22, sections 19 and 22 being flat and semicular in shape and intermediate section 21 having curved ends as well as being curved along its length so as to be received within foot rest 18 when the outer plate 12 is in a flat, open tortilla receiving position as shown in FIG. 1. As can be seen a tortilla may be positioned easily on the outer plate in the open position without the aid of a clamp or tong.

All sections of the outer plate 12 as well as inner plate 13 include random or uniformly spaced perforations 23 for passing cooking oil in the vessel through the respective plates 12 and 13 onto the tortilla being cooked.

Outer plate section 19 is rigidly attached to end portion 17 by means of rivets 24 or other suitable means and positioned so intermediate section 21 is received and supported within foot rest 18 when the outer plate 12 is in its flat open, tortilla receiving, position. Sections 19, 21, and 22 are pivotally interconnected by means of interfitting hinge members 26 integrally formed on adjacent edges and which receive pintles or pin 27. Section 22 may be provided with one or more fingers 28 that pass over the hinge and pintle and engage the intermediate section 21 to support section 22 in a horizontal plane when the outer plate is in the open position, the foot rest 18 receiving and supporting intermediate section 21.

Figure 2:
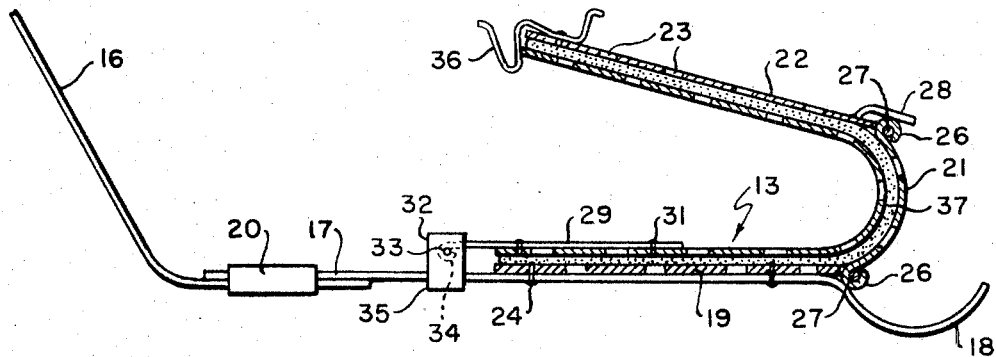
FIG. 2 illustrates the utensil of FIG. 1 in a closed tortilla forming and cooking position.

Inner plate 13 also includes perforations 23 and is U shaped in cross sectional configuration as shown in FIG. 2. A support member 29 is rigidly attached at one end to plate 13 by means of rivets 31 or the like and pivotally attached between shoulders 32 of bracked 35 on pivot pin 33 passing through eye 34 formed on member 29. Bracket 35 is rigidly attached to end portion 17 of handle 16.

The U shaped inner plate 13 is received within the outer plate 12 when sections 21 and 22 are pivoted about hinge pins 27 to form and hold tortilla 37 as shown in FIG. 2. A spring latching finger 36 attached to section 22 secures the inner and outer plates together in the closed cooking position. This operation may be readily accomplished by the user with a fork or the like if the section 22 or latching finger 36 is hot to the touch.

In operation the tortilla 37, which is of approximately the same diameter or slightly smaller than the outer and inner plates, is placed on the outer plate 12 with the utensil in the open position as shown in FIG. 1. After heating in the cooking oil for a short time to render the tortilla flexible, sections 21 and 22 are pivoted about the hinge pins 27 folding the tortilla over the U-shaped top plate which is in a horizontal position as shown in FIG. 2 until the latching finger 36 snaps over the top plate 13 to secure the plates together. As noted this may be easily accomplished by the user with a fork or other instrument or by manipulating the cooking utensil against the cooking vessel.

The formed tortilla may then be cooked in a shallow vessel such as a skillet in sufficient cooking oil to cover the now downturned lower parallel sides of the outer and inner plates until one side of the formed tortilla is cooked before turning the utensil over in the skillet and cooking the other side. The utensil may be rested upon the curved intermediate section 21 to cook the midsection of the tortilla, the perforations permitting uniform exposure of the entire surface of the formed tortilla to the cooking oil. If desired the inner and outer plates may be completely submersed in cooking oil. Where required for easier manipulation in a small skillet the length of handle portion 16 may be shortened by means of clamp 20.

Figure 3:
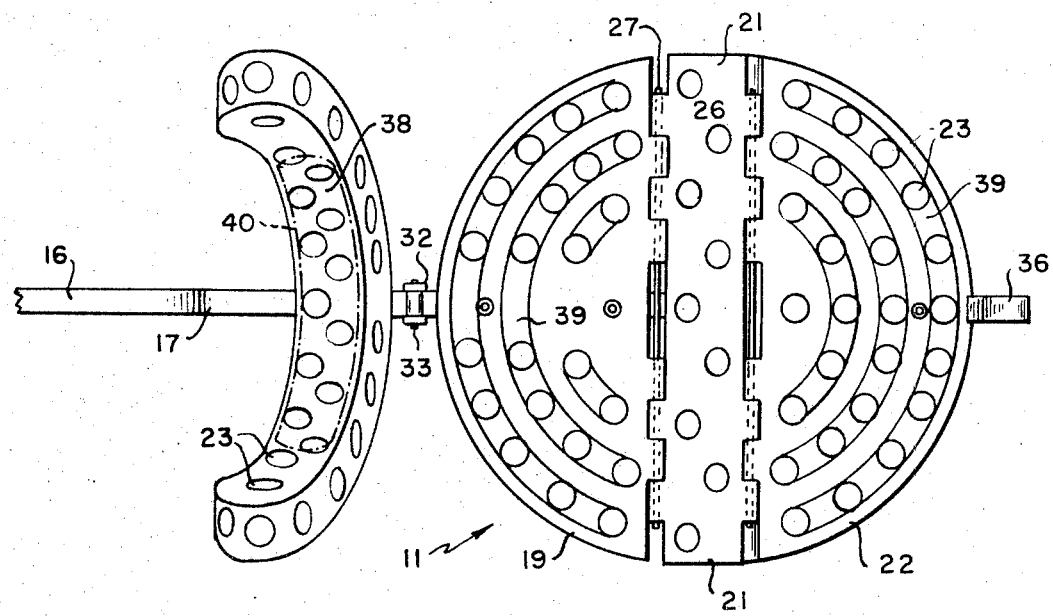
FIGS. 3 and 4 illustrate an alternative embodiment of the invention shown in FIGS. 1 and 2 including means for filling a cavity within a preformed tortilla with a food substance prior to cooking said tortilla.
Figure 4:
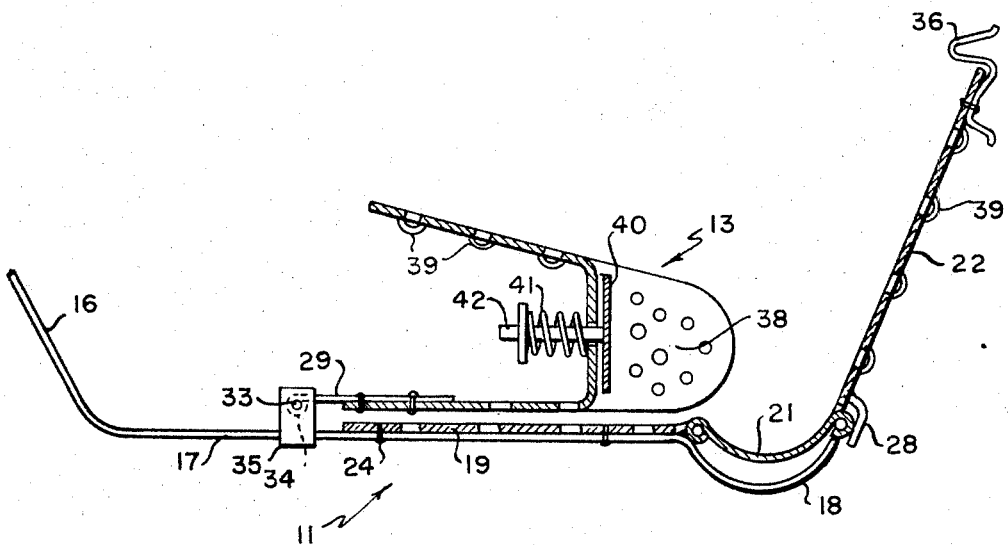

FIGS. 3 and 4 disclose alternative embodiments of the invention the same as that previously described with the addition of an arcuately shaped cavity 38 formed in the mid portion of inner plate 13 for receiving a meat or other food substance as a filling to be cooked simultaneously with and within the formed tortilla.

The cavity 38 is shaped such that the periphery of the tortilla is gripped between the inner and outer plates when the utensil is in the closed position as shown in FIG. 4, the cavity 38 being semicicular as shown in FIG. 3. A plate 40 defining a displaceable surface within the cavity 38 corresponding to the curvature of the cavity may also be provided. The plate 40 is supported by plunger 42 that extends through the sidewall of the cavity and loading spring 41. Upon completion of the cooking operation and in the event the filler should stick within the cavity, it may easily be displaced and removed with the taco shell be depressing plunger 42, the spring returning plate 40 to its original position upon release of the plunger 42.

Both embodiments of the invention may also be provided with grooves 39 within their respective adjacent interfaces that interconnect perforations 23. These grooves 39 permit a flow of cooking oil between perforations and over the surface of the tortilla exposed to the cooking oil enhancing and improving uniform cooking of the tortilla. The grooves 39 also permit more even flow and distribution of any juices from the meat or other filler inserted in the cavity 38 improving the flavor of the taco when using the alternative embodiment.

Although preferred embodiments of the invention have been described in detail numerous changes and modifications may be made within the principles of the invention which is to limited only by the scope of the appended claims.

We claim:

1. A utensil for forming and cooking a tortilla comprising:
   a. a first outer plate formed of two semi-circular sections and an intermediate section;
   b. means pivotally interconnecting said sections of said outer plate;
   c. a handle;
   d. means for rigidly attaching one of said sections of said outer plate to said handle to support said multi-section outer plate in a substantially flat open position to receive a tortilla;
   e. and a perforated U shaped inner plate pivotally attached to said handle for preforming said tortilla when said sections of said outer plate are positioned thereabout in a closed position and;
   f. means for detachably securing said outer plate to said inner plate in said closed position.

2. A utensil as defined in claim 1 including means for adjusting the length of said handle.

3. A utensil as defined in claim 1 wherein said intermediate section is curved along its length, and said handle includes a curved portion providing a foot rest, said intermediate section being received within said curved portion of said handle when said outer plate is in an open position.

4. A utensil as defined in claim 1 including passageways interconnecting two or more of said perforations in said respective sections forming said outer plate and in said inner plate.

5. A utensil as defined in claim 1 including a filler receiving cavity in said inner plate.

6. A utensil as defined in claim 5 including passageways interconnecting two or more perforations in said inner plate and also said outer plate.

7. A utensil as defined in claim 5 including a displaceable surface defining a portion of said cavity.

* * * * *